UNITED STATES PATENT OFFICE.

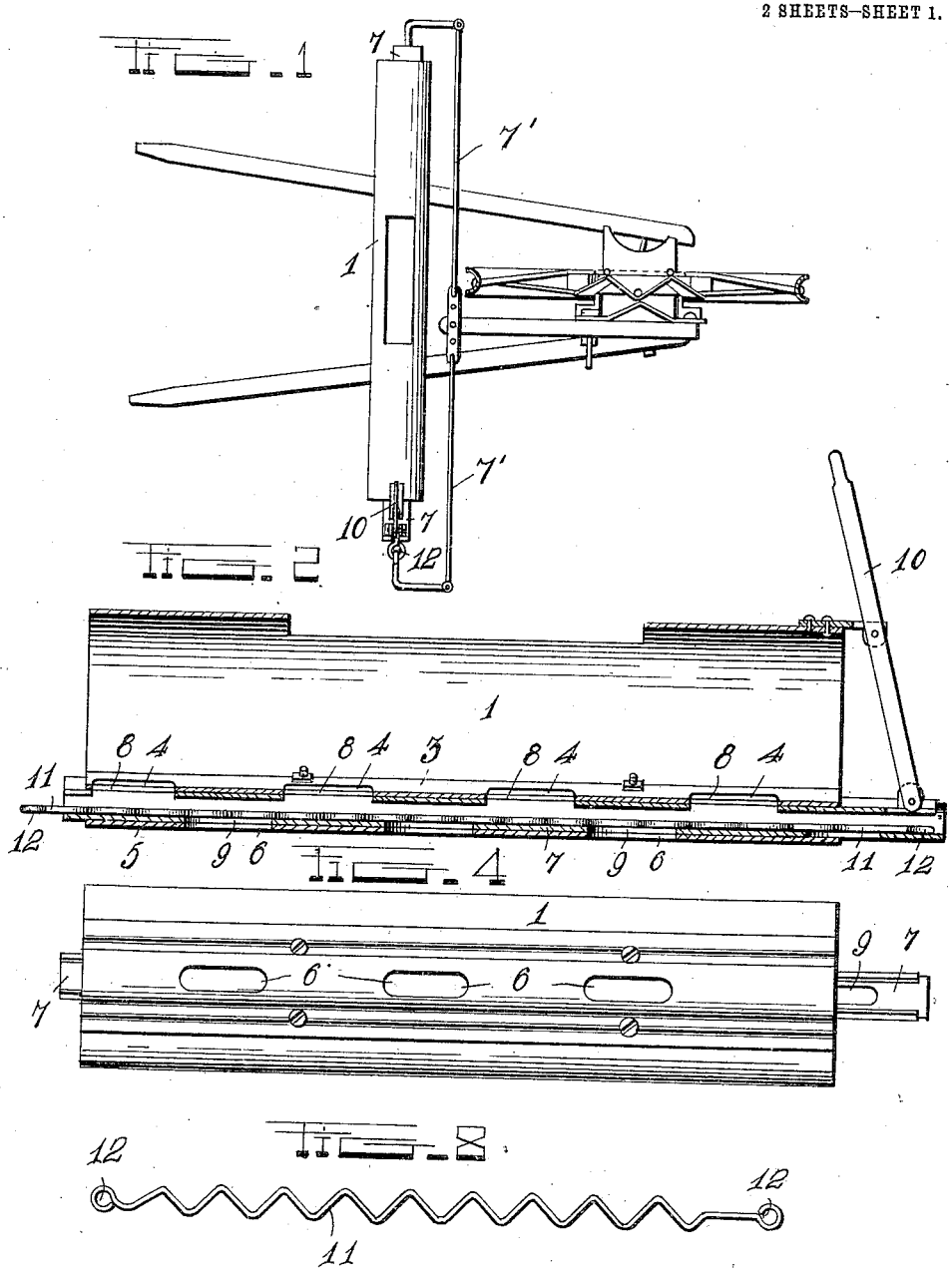

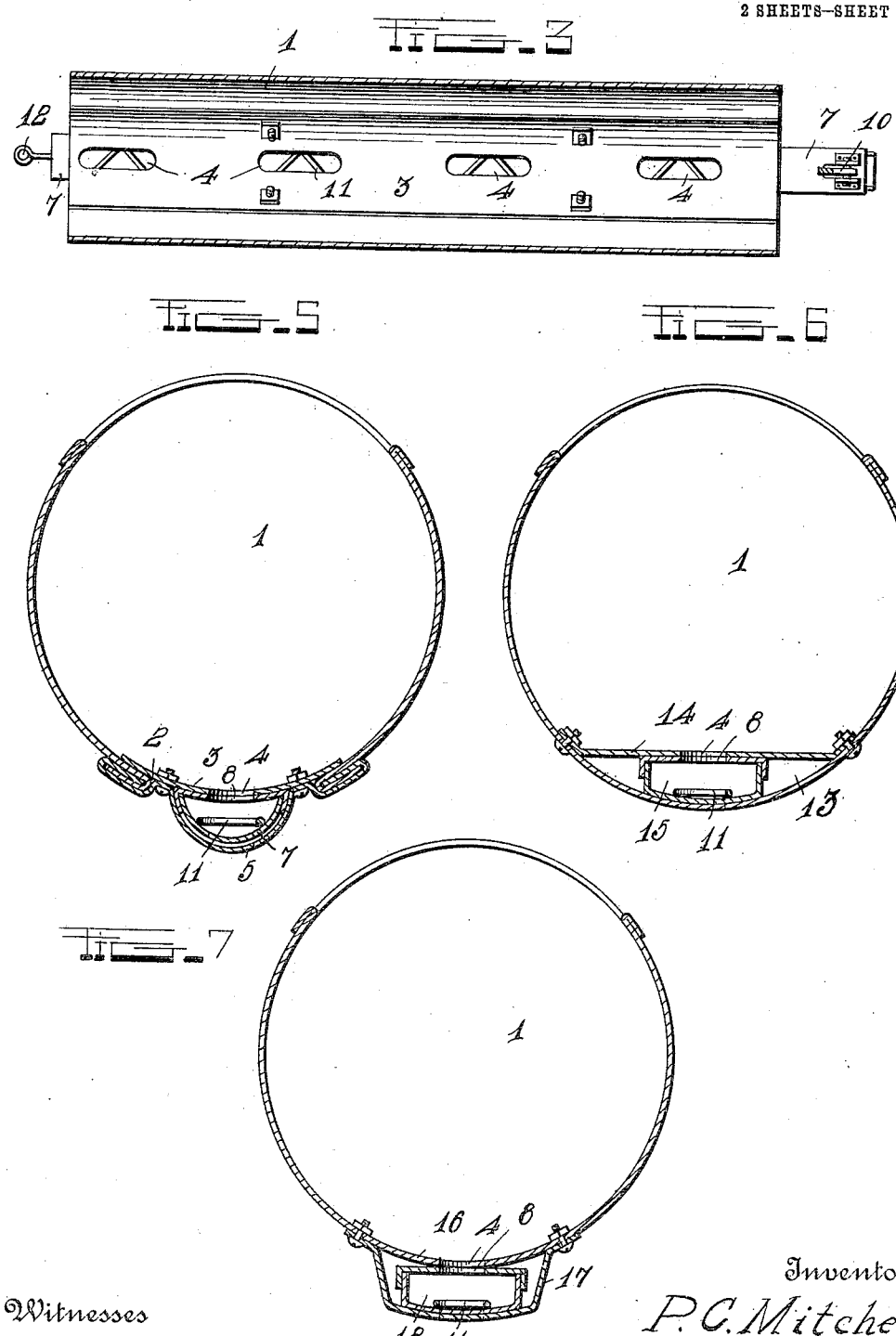

PRESTON C. MITCHELL, OF HOMER, MICHIGAN.

SEED-HOPPER.

971,917. Specification of Letters Patent. Patented Oct. 4, 1910.

Application filed January 27, 1910. Serial No. 540,361.

*To all whom it may concern:*

Be it known that I, PRESTON C. MITCHELL, a citizen of the United States, residing at Homer, in the county of Calhoun and State of Michigan, have invented certain new and useful Improvements in Seed-Hoppers; and I do declare the following to be a full, clear, and exact description of the invention, such as will enable others skilled in the art to which it appertains to make and use the same.

This invention relates to improvements in seed hoppers for seed sowing machines.

One object of the invention is to improve the construction of seed hoppers or boxes shown in U. S. Patents, No. 238040 of February 22nd, 1881, and No. 275633 of April 10th, 1883, granted to Mason Gibbs, whereby the feed of the hoppers may be regulated to sow the desired quantity of seed per acre and whereby all kinds of grass and small grain seeds may be readily sown and evenly distributed.

With the foregoing and other objects in view, the invention consists of certain novel features of construction, combination and arrangement of parts as will be more fully described and particularly pointed out in the appended claims.

In the accompanying drawings, Figure 1 is a top plan view of a seed sower showing the application of the improved hopper; Fig. 2 is a central vertical longitudinal section of the hopper; Fig. 3 is a horizontal section; Fig. 4 is a bottom plan view; Fig. 5 is a vertical cross section; Figs. 6 and 7 are vertical cross sectional views of modified forms of the hopper, and, Fig. 8 is a detail plan view of the seed agitating rod.

In the embodiment of the invention, I provide a hopper or feed box 1 which may be of any suitable shape and of any desired length and size, said hopper being arranged on and connected with the machine as shown in Fig. 1 of the drawings, and as described in the patents herein referred to or in any other suitable manner. In the upper side of the hopper is formed an opening through which the seed or grain is placed in the hopper. In the bottom of the hopper is formed a longitudinal slot or passage 2, over which on the inner side of the hopper is secured a stationary feed plate 3 having formed therein at suitable intervals a series of elongated feed openings 4. Arranged below the feed plate 3 and secured at its opposite edges to the bottom of the hopper along the edges of the slot 2 is a feed trough 5, in the bottom of which is formed a series of elongated feed openings 6, said openings being preferably arranged midway between the openings in the feed plate 3.

Slidably mounted in the trough 5 with its upper side in close engagement with the under side of the feed plate 3 is an adjustable tubular slide 7, the lower side of which is adapted to conform to the shape of the trough 5 and to closely fit the same while its upper side is formed to conform to the shape of the feed plate 3 and to closely engage the lower side of the same. In the upper side of the tubular slide 7 is formed a series of elongated feed openings 8, while in the lower side of the same is formed a series of feed openings 9. The openings 9 in the bottom of the slide are preferably arranged midway between the openings in the upper side thereof. By adjustably mounting the slide 7 in the trough 5, the feed openings 8 in the upper side thereof may be brought more or less into alinement with the feed openings 4 in the feed plate 3, and the feed openings 9 in the bottom of the slide brought more or less into alinement with the feed openings 6 in the bottom of the trough 5. By thus adjusting the slide, the feed openings may be regulated to the proper size for sowing any desired quantity of seed or grain to the acre.

Any suitable means may be employed for adjusting the slide 7 to regulate the size of the feed passages, said slide being preferably adjusted by means of a hand-lever 10, which is pivotally mounted in a suitable bracket at one end of the hopper and having its lower end loosely connected with the adjacent end of the slide as shown. The frictional engagement between the slide and the trough and feed plate is sufficient to hold the slide in its adjusted positions.

In order to insure the positive feeding of the seed through the feed openings in the slide and trough, I preferably provide a suitable agitator which is here shown and is preferably in the form of a corrugated rod 11 which is loosely engaged with the slide. The opposite ends of the rod 11 are provided with eyes or loops 12 to which are connected the ends of suitable connecting rods or cords 7' by means of which the agitating rod is connected with a reciprocating mechanism which is operatively connected with the ground wheel of the machine.

In Fig. 6 of the drawings is shown a slightly modified form of the hopper. In this instance, the bottom of the hopper forms a trough 13 above which and spaced therefrom is arranged a feed plate 14 similar to the feed plate 3 of the first form of the device. The feed plate 14 and trough forming portion of the hopper are provided with feed openings arranged as described in the first form of the device. In the trough 13 below the feed plate 14 is adjustably mounted a feed slide 15 which is constructed and operated in the same manner as the slide 7.

In Fig. 7 of the drawings, the bottom of the hopper is arranged to form a feed plate 16 below which and secured to the outer side of the hopper is a trough 17 similar to the trough 5, said feed plate and trough having arranged therein feed openings such as previously described. In the trough 17 below the feed plate 16 is arranged an adjustable slide 18 corresponding with and operated in the same manner as the slides 7 and 15 previously described.

The modified forms of the hopper are provided with agitating rods corresponding to the rod 11 of the preferred form of the hopper.

By providing a feeding mechanism for the hoppers, as herein shown and described, any kind of grass or small grain seeds may be sown, thus dispensing with the necessity of providing different hoppers for different kinds of seed. With my improved hopper and feed mechanism, chaffy as well as clean seeds, may also be successfully sown.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a seed hopper of the class described, a feed plate arranged in the bottom of the hopper, said plate having formed therein a series of feed openings, a trough arranged below said feed plate, said trough having formed therein a series of feed openings, said openings being out of alinement with the openings in the feed plate, a tubular slide adjustably mounted in said trough, said slide having formed in its upper and lower sides feed openings, said openings being out of alinement and being adapted to be brought more or less into alinement with the feed openings in said feed plate and trough thereby regulating the size of the feed openings from the hopper.

2. In a seed hopper of the class described, a feed plate arranged in the bottom of the hopper, said plate having formed therein a series of feed openings, a trough arranged below said feed plate, said trough having formed therein a series of feed openings, said openings being out of alinement with the openings in the feed plate, a tubular slide adjustably mounted in said trough, said slide having formed in its upper and lower sides feed openings, said openings being out of alinement with the openings in said trough and feed plate, an adjusting lever connected with said slide whereby the latter may be adjusted to bring the feed openings therein more or less into alinement with the openings in said feed plate and trough thereby regulating the size of the feed openings from the hopper, and an agitator arranged in said slide to positively feed the seed therefrom.

3. A seed hopper of the class described having formed in its lower side a longitudinal slot, a feed plate arranged in said hopper over said slot, said plate having formed therein a series of elongated feed openings, a trough secured to the outer side of the hopper below said feed plate, said trough having formed therein a series of elongated feed openings and arranged between or out of alinement with the feed openings in said feed plate, a tubular slide adjustably mounted in said trough, said slide having formed in its upper and lower sides series of elongated feed openings, said feed openings being out of alinement, an adjusting lever connected with said slide whereby the latter may be adjusted to bring the feed openings therein more or less into alinement with the feed openings in the feed plate and trough whereby the size of said openings is regulated, and a corrugated agitating rod arranged in said slide and adapted to be reciprocated therein to positively feed the seed therefrom.

In testimony whereof I have hereunto set my hand in presence of two subscribing witnesses.

PRESTON C. MITCHELL.

Witnesses:
 MYRON H. NICHOLS,
 DON P. MITCHELL.